(12) United States Patent
Murphy et al.

(10) Patent No.: US 11,115,522 B2
(45) Date of Patent: Sep. 7, 2021

(54) CUSTOMIZATION OF CNAM INFORMATION FOR CALLS PLACED TO MOBILE DEVICES

(71) Applicant: FIRST ORION CORP., Little Rock, AR (US)

(72) Inventors: Brandon Wayne Murphy, Little Rock, AR (US); Robert Collin Seely, Little Rock, AR (US); Aaron Christopher Jacobi, Little Rock, AR (US); Benjamin Michael Lavigne, Little Rock, AR (US); Mark Bradley McHenry, Vilonia, AR (US); John Cooper Gillespie, Beebe, AR (US); Matthew Jack Beckham, Conway, AR (US); Kristen Chipolla Sanchez, Bryant, AR (US); Lyndsay Michelle Eddy, Little Rock, AR (US); Jay Todd Callaway, Conway, AR (US)

(73) Assignee: FIRST ORION CORP., Little Rock, AR (US)

( * ) Notice: Subject to any disclaimer, the term of this patent is extended or adjusted under 35 U.S.C. 154(b) by 0 days.

(21) Appl. No.: 16/565,077

(22) Filed: Sep. 9, 2019

(65) Prior Publication Data

US 2021/0075907 A1 Mar. 11, 2021

(51) Int. Cl.
| | | |
|---|---|---|
| *H04M 1/56* | (2006.01) |
| *H04M 15/06* | (2006.01) |
| *H04M 3/42* | (2006.01) |
| *H04M 3/436* | (2006.01) |
| *H04L 29/12* | (2006.01) |
| *H04M 3/22* | (2006.01) |
| *H04L 12/733* | (2013.01) |

(52) U.S. Cl.
CPC ........ *H04M 3/42059* (2013.01); *H04L 45/20* (2013.01); *H04L 61/106* (2013.01); *H04M 3/2254* (2013.01); *H04M 3/42042* (2013.01); *H04M 3/436* (2013.01)

(58) Field of Classification Search
None
See application file for complete search history.

(56) References Cited

U.S. PATENT DOCUMENTS

| | | | | |
|---|---|---|---|---|
| 8,515,037 | B2 * | 8/2013 | Ye | H04M 3/42017 379/142.06 |
| 9,203,954 | B1 * | 12/2015 | Van Rensburg .. | H04M 3/42042 |
| 9,338,289 | B1 * | 5/2016 | Goyal | H04W 8/183 |
| 2006/0002555 | A1 | 1/2006 | Moss et al. | |
| 2007/0127656 | A1 * | 6/2007 | Citron | H04M 1/57 379/142.01 |
| 2007/0201684 | A1 | 8/2007 | Boghani | |

(Continued)

*Primary Examiner* — Quoc D Tran

(57) ABSTRACT

One example method of operation may include identifying a call from a calling device destined for a mobile device, responsive to identifying a calling device number assigned to the calling device, accessing a call content application programming interface (API), operated by a content delivery device, configured to deliver to the mobile device a first caller identification name (CNAM) or a second CNAM, assigned to the calling device number, determining a context assigned to a mobile device number assigned to the mobile device, selecting one of the first CNAM and the second CNAM based on the context, and assigning the selected CNAM to the call.

20 Claims, 14 Drawing Sheets

450

(56) References Cited

U.S. PATENT DOCUMENTS

| | | |
|---|---|---|
| 2009/0046839 A1 | 2/2009 | Chow et al. |
| 2009/0197583 A1 | 8/2009 | Penn et al. |
| 2011/0201321 A1* | 8/2011 | Bonner ............ H04M 3/42068 |
| | | 455/415 |
| 2013/0044869 A1 | 2/2013 | Citron et al. |
| 2013/0084839 A1* | 4/2013 | Gosselin ................ H04W 4/16 |
| | | 455/415 |
| 2013/0094643 A1* | 4/2013 | Osterlund ............... H04M 3/42 |
| | | 379/207.13 |
| 2015/0304490 A1* | 10/2015 | Huang ............. H04M 3/42042 |
| | | 370/259 |
| 2015/0326691 A1* | 11/2015 | Efrati .................... H04L 67/306 |
| | | 709/206 |
| 2019/0306322 A1 | 10/2019 | Bostick et al. |
| 2020/0057946 A1 | 2/2020 | Singaraju et al. |
| 2021/0075885 A1* | 3/2021 | Hassan ............. H04M 3/42051 |

\* cited by examiner

350

CUSTOMIZATION OF CNAM INFORMATION FOR CALLS PLACED TO MOBILE DEVICES

TECHNICAL FIELD OF THE APPLICATION

This application relates to call content management, and more specifically to customization of caller-ID name (CNAM) information for calls placed to mobile devices.

BACKGROUND OF THE APPLICATION

Conventionally, mobile device users receive calls from undesired sources every day and sometimes several times an hour depending on the particular day. The source numbers which are used to dial the users may be local numbers, long-distance numbers, anonymous numbers, spoofed numbers, etc. The calls may be spam calls, scam calls, robocalls, etc. With recent updates to smartphones and the call screen user interfaces used during a call, the sources of the calls are generally displayed in some capacity to permit the user to identify whether to answer the phone call or not, such as caller ID or other data services indicating a name and/or location origin of the number assigned to the caller. However, in the event that the number is not known to the caller or is matched to his or her previously stored contacts, the caller may require additional information to be shared to demonstrate credibility as a reputable service or advertisement and not just some arbitrary caller without a reputation or legitimate product/service to share with the caller. There are generally limited tools available to demonstrate that the call is likely to be a scam or spam caller, or, a reputable caller, especially in real-time, so a caller can quickly decide whether to answer the call, drop the call, block the call, etc. With approximately 90 percent of business calls going unanswered, both ends users and callers require more advanced strategies for identifying callers and making informed decisions regarding whether to answer a call.

SUMMARY OF THE APPLICATION

Example embodiments of the present application provide at least a method that includes at least one of identifying a call from a calling device destined for a mobile device, responsive to identifying a calling device number assigned to the calling device, accessing a call content application programming interface (API), operated by a content delivery device, configured to deliver to the mobile device a first caller identification name (CNAM) or a second CNAM, assigned to the calling device number, determining a context assigned to a mobile device number assigned to the mobile device, selecting one of the first CNAM and the second CNAM based on the context, and assigning the selected CNAM to the call.

Another example embodiment may include a system that includes a computing device configured to perform one or more of identify a call from a calling device destined for a mobile device, responsive to identification of a calling device number assigned to the calling device, access a call content application programming interface (API), operated by a content delivery device, configured to deliver to the mobile device a first caller identification name (CNAM) or a second CNAM, assigned to the calling device number, determine a context assigned to a mobile device number assigned to the mobile device, select one of the first CNAM and the second CNAM based on the context, and assign the selected CNAM to the call.

Another example embodiment may include a non-transitory computer readable storage medium configured to store instructions that when executed cause a processor to perform one or more of identifying a call from a calling device destined for a mobile device, responsive to identifying a calling device number assigned to the calling device, accessing a call content application programming interface (API), operated by a content delivery device, configured to deliver to the mobile device a first caller identification name (CNAM) or a second CNAM, assigned to the calling device number, determining a context assigned to a mobile device number assigned to the mobile device, selecting one of the first CNAM and the second CNAM based on the context, and assigning the selected CNAM to the call.

Still another example embodiment may include a method that provides one or more of identifying a call from a calling device destined for a mobile device, identifying a calling device number associated with the calling device and a mobile device number associated with the mobile device, determining whether a stored calling relationship exists between the calling device number and the mobile device number, and appending one of a plurality of caller identification names (CNAM) to the call based on the determination as to whether there is a stored calling relationship.

Still yet a further example embodiment may include a system that includes a computing device configured to perform one or more of identify a call from a calling device destined for a mobile device, identify a calling device number associated with the calling device and a mobile device number associated with the mobile device, determine whether a stored calling relationship exists between the calling device number and the mobile device number, and append one of a plurality of caller identification names (CNAM) to the call based on the determination as to whether there is a stored calling relationship.

Still yet another example embodiment may include a non-transitory computer readable storage medium configured to store instructions that when executed cause a processor to perform one or more of identifying a call from a calling device destined for a mobile device, identifying a calling device number associated with the calling device and a mobile device number associated with the mobile device, determining whether a stored calling relationship exists between the calling device number and the mobile device number, and appending one of a plurality of caller identification names (CNAM) to the call based on the determination as to whether there is a stored calling relationship.

DETAILED DESCRIPTION OF THE APPLICATION

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

Example embodiments provide call content management of content in associations with calls to and from mobile device users. Enterprise entities (e.g., government agencies, corporate environments, etc.) may desire to have their named services readily identified to mobile device users when providing and confirming appointments, services, advertising, etc. Mobile device users require secure communication channels to reduce fraud associated with scam callers and other falsified entities seeking to monetize from users using unexpected and undesirable approaches, such as solicitation calls and mobile device messages (SMS).

Figure 1:
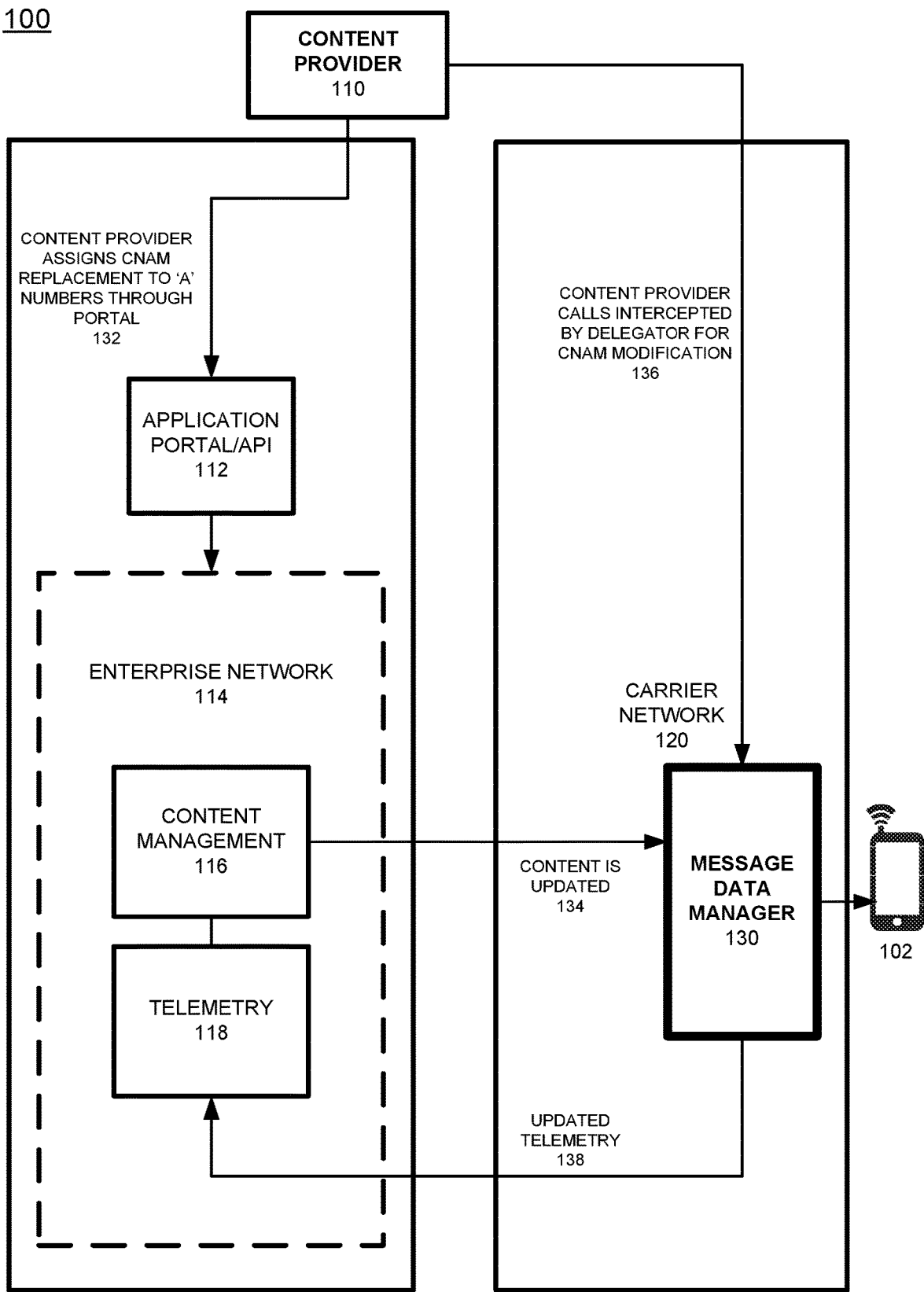
FIG. 1 illustrates an example call content and CNAM management network configuration according to example embodiments.

FIG. 1 illustrates an example call content and CNAM management network configuration 100 according to example embodiments. Referring to FIG. 1, the content provider 110 is a server and/or database which stores and manages content, such as images, word strings/phrases, URL links and other data that is sent to one or more end user devices, such as mobile device(s) 102. The content provider 110 may assign the caller identification name (CNAM) replacement 132, which would override any default or other CNAM currently assigned to a particular calling number(s) ('A' numbers) which are used to call any called numbers or 'B' numbers associated with the end user devices.

The replacement CNAMs may be assigned through a portal application programming interface (API) 112. The 'A' number party may be an enterprise entity network 114 with a content management device 116 and a telemetry datastore 118, which receives and stores data feedback from the message data manager device 130, which may be a call server or other calling entity responsible for managing content, CNAM data and other data shared with the called entities 102.

The message data manager 130 may provide an interception function for calls sent from the content provider which require a CNAM modification 136. A carrier network 120 may be integrated with the enterprise calls sent to and from the message data manager 130. The call content may be updated 134 according to a call campaign effort to share advertising data and other content with the called devices 102. The results of the calls sent may be provided as feedback in an updated telemetry format 138, which includes calls answered, call times, content selected (i.e., URLs, video, etc.). A call campaign may include calling various 'B' numbers for various purposes such as updates to existing memberships, new offers and subscriptions, etc. The term 'CNAM' may include basic 15-character alphanumeric data or may be referring to an electronic CNAM (ECNAM), which may include images, video, audio, weblinks, characters in excess of 15 characters, etc. Use of the term CNAM in this specification may be associated with CNAM and/or ECNAM interpretations.

Figure 2:
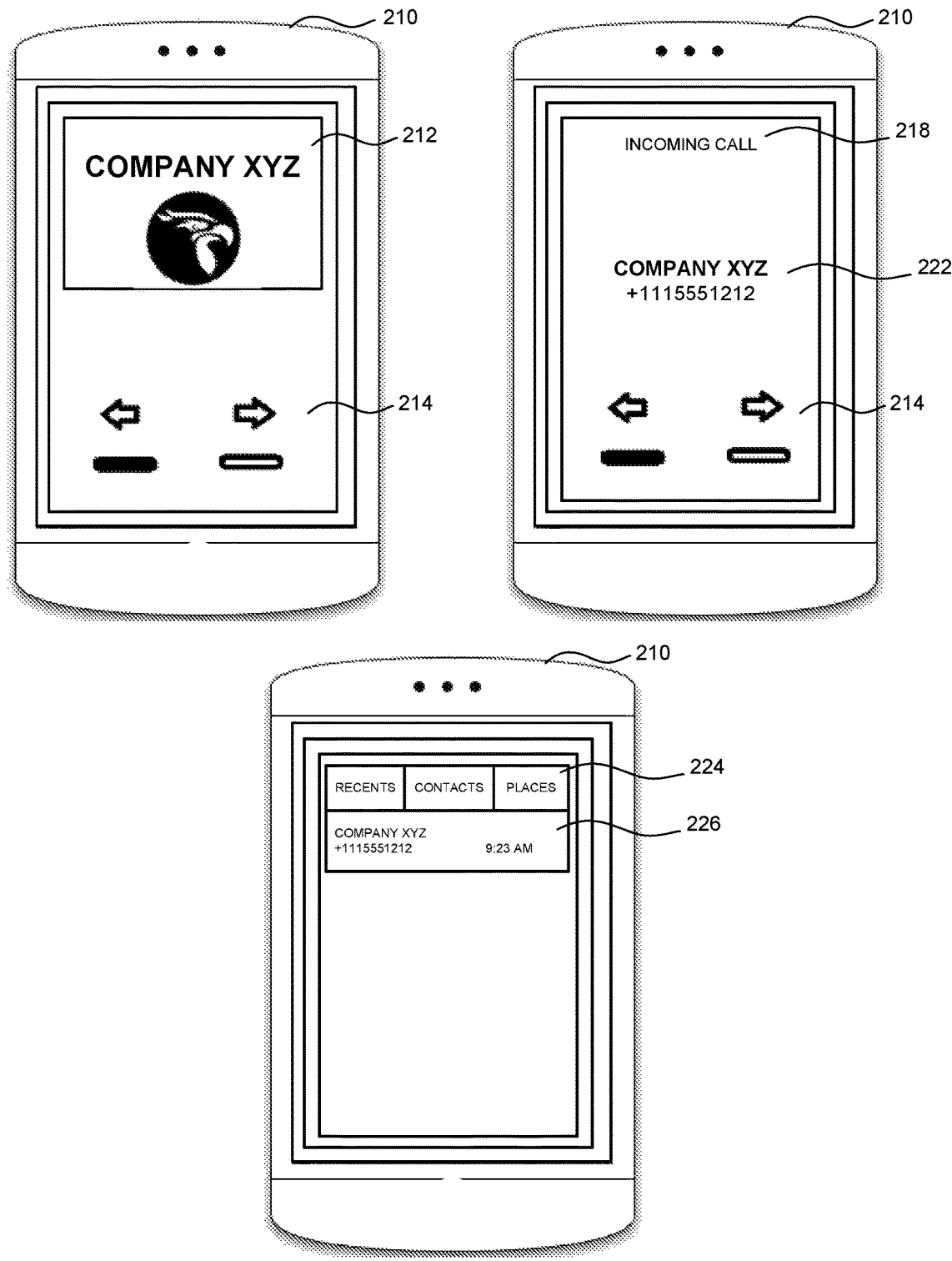
FIG. 2 illustrates a user device graphical user interface of a customized call content configuration according to example embodiments.

FIG. 2 illustrates a user device graphical user interface of a customized call content configuration according to example embodiments. Referring to FIG. 2, the configuration 200 provides an example where a user device, such as an end user, 'B' number device 210, etc., receives a call from an enterprise organization, such as, for example, company 'XYZ' 212, which may have its name and logo displayed as part of a content sharing effort performed by the content provider device 110 and/or the message data manager device 130. In this example, the user device 210 may receive a call and the caller content is pushed as an image/link/video, etc., 212 to the device 210 and is displayed during the call ringing process. The option to answer or drop the call 214 is also displayed during the ringing process. In the next example, the user device may not be configured to receive the image data or the image data may not be sent with the call or referenced by the call to appear during the call. In this example, the more conventional incoming call notification 218 may be displayed along with the caller-ID information of the caller, however, in this case, the customized CNAM data 222 may be sent to appear in place of a default CNAM, such as just a number with no name or other identification data. The name information may also be logged in a call log 224 as a new entry 226 with the name, number, date and time of call information. The modified CNAM data may be stored with the number for future reference purposes, which permits the called device to access the number and identify the caller as a particular entity based on the CNAM data provided during an initial call.

Figure 3A:
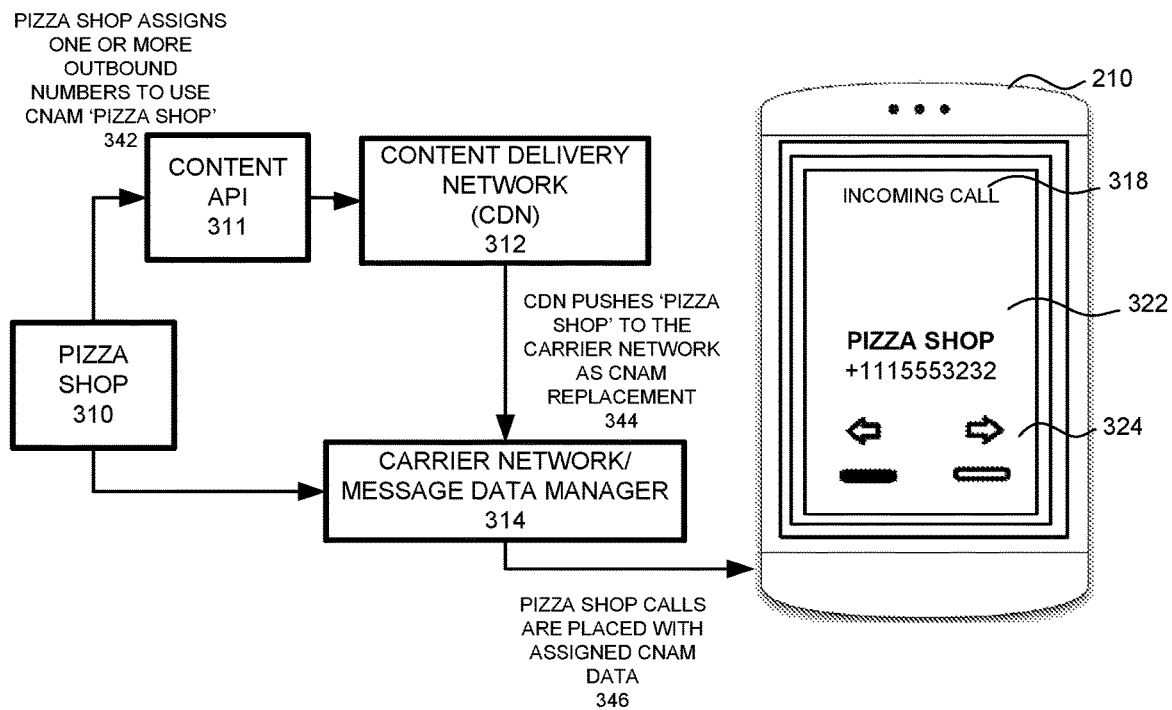
FIG. 3A illustrates a logic diagram of a process for customizing and forwarding primary CNAM information to a mobile device.

FIG. 3A illustrates a logic diagram of a process for customizing and forwarding primary CNAM information to a mobile device. Referring to FIG. 3A, the example configuration 300 provides a scenario where the 'A' number entity 'pizza shop' 310 owns and manages one or more 'A' numbers assigned to its calling platform. In operation, the pizza shop may assign one or more outbound 'A' numbers by default to pair with the CNAM 'Pizza Shop' 342. The content API 311 may forward the CNAM 'Pizza Shop' to the carrier network 314 via the content delivery network 312. The CDN pushes the CNAM 'Pizza Shop' 344 to the carrier network as the CNAM replacement to replace the caller ID that was previously assigned to the 'A' number and which would normally be used for outgoing calls. The pizza shop will place calls as normal to customers for confirming orders, sending updates (e.g., SMS updates, call updates, etc.) regarding orders placed by customers or for other callback purposes. Those calls are then displayed with the replacement CNAM 'Pizza Shop' 346. A user device 210 may display an incoming call 318 with a 'Pizza Shop' name and number 322 and an option to accept or reject the call 324.

Figure 3B:
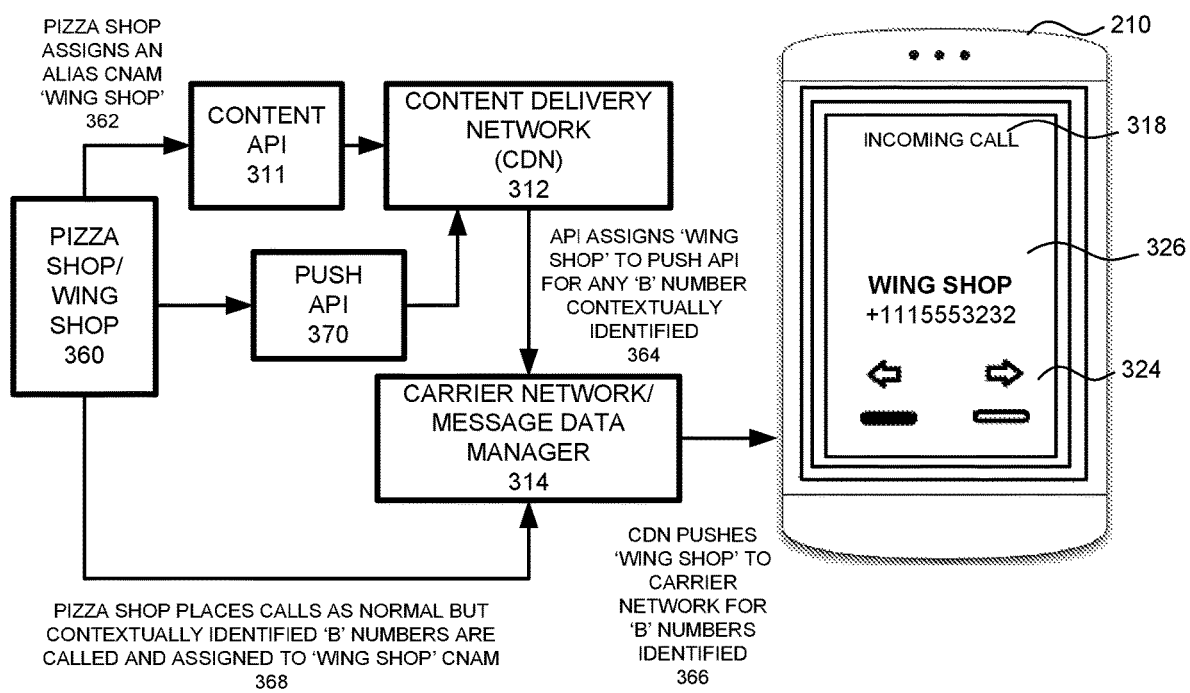
FIG. 3B illustrates a logic diagram of a process for customizing and forwarding alternative CNAM information to a mobile device.

FIG. 3B illustrates a logic diagram of a process for customizing and forwarding alternative CNAM information to a mobile device. Referring to FIG. 3B, in this example configuration 350, the 'pizza shop' may have an alternative identification/name, such as 'wing shop' 360 which is identified by customers as a separate business name, menu and/or ordering option. The name 'wing shop' may be assigned as an alternative CNAM identifier 362 which is invoked and assigned to certain inbound/outbound 'A' numbers according to a context requirement. For example, the context requirement may be a past caller identifier of a calling party customer identified as having a certain 'B' number and as having previously called a certain 'A' number, ordered wings as a menu item and then had a subsequent order fulfilled and/or delivered from the wing shop as opposed to just the pizza shop.

The context data may be stored in memory and applied for callers (identified by their 'B' numbers) who may have an existing/previous order with one or more wing shop items ordered at any given time. For example, an order may be identified via a computer order record for a particular caller name/'B' number. When the order has wing shop related menu items, the customer's number may be stored in a contextual category assigned to wing shop instead of pizza shop, or, may be stored in both categories identified by one or more flags for the one or more items ordered. For example, a customer that only orders items on the pizza shop menu may have a first flag assigned to their profile information (e.g., name/number). When the current and/or previous order has wing shop menu items, the profile information may then be assigned a separate flag to indicate the order status as a wing shop. One or both flags may be used to indicate the customer's relationship. The CNAM assignment decision may be based on the most recent and whether any menu items are from one business name or the other. As a result, if the business entity needs to contact the customer by their number, the call may be routed via the content API 311 to a same 'A' number, but with a different CNAM identifier of 'wing shop' 326. In this example, the push API 370 is setup to identify the wing shop customers based on their context information 364 (e.g., stored 'B' number, order information, etc.), and the correlation of the context information provides the CNAM selection from the push API 370 to the content API 311. The CDN 312 can now push the selected CNAM for the wing shop to the carrier 314 with the selected 'B' numbers identified 366. The pizza shop can place calls normally 368 and contextual identification will cause the 'B' numbers to be identified and selected for 'pizza shop' and/or 'wing shop' depending on the customer context information.

Figure 4A:
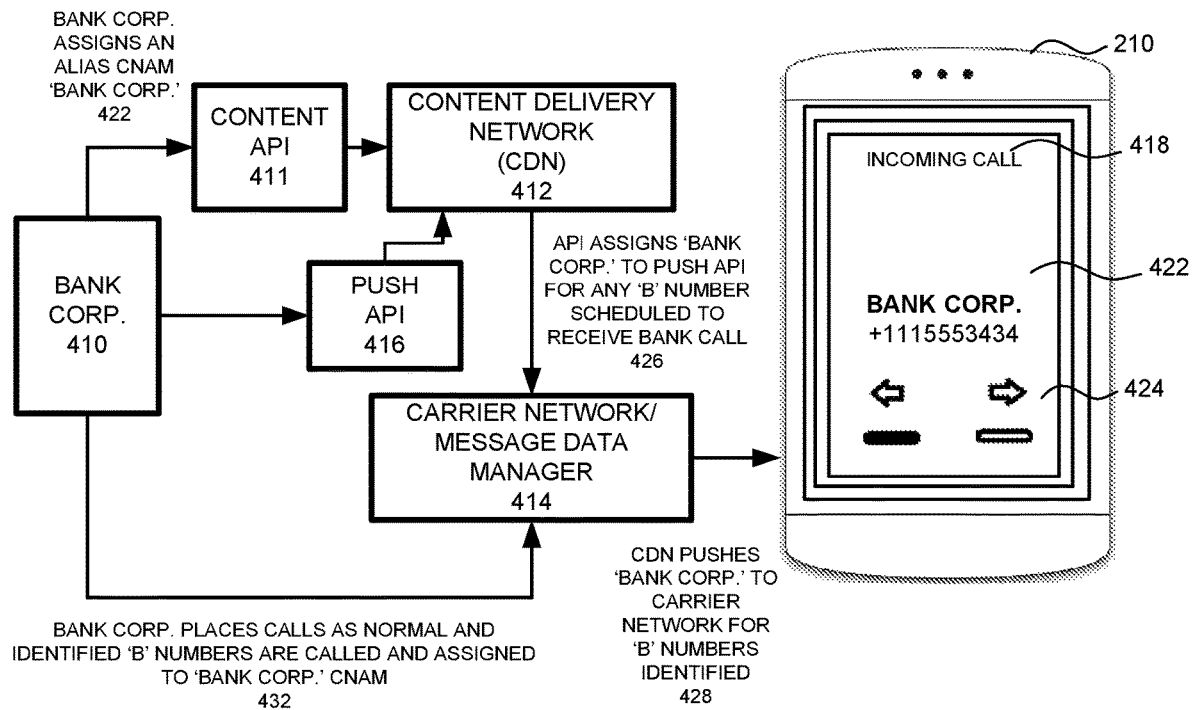
FIG. 4A illustrates a logic diagram of another process for customizing and forwarding primary CNAM information to a mobile device.

FIG. 4A illustrates a logic diagram of another process for customizing and forwarding primary CNAM information to a mobile device. Referring to FIG. 4A, the configuration 400 provides an example of a bank company 'bank corp.' 410 using the optimized CNAM management system to place calls to customer 'B' numbers with preferred CNAM data. In this example, the bank corp. 410 may setup an alias of 'bank corp.' 422. The content API 411 may use the push API 416 to communicate CNAMs with various 'B' number devices, such as device 210. Those 'B' numbers may be part of a schedule used to initiate a calling campaign for promotional purposes. The CDN 412 may push 428 the CNAM 'Bank Corp.' to any B number scheduled to receive a bank call 426. The enterprise (Bank Corp.) can place calls as normal 432 and the identified 'B' numbers are called via the carrier network/message data manager 414 and assigned to the 'Bank Corp.' CNAM. The device 210 may receive an incoming call notification 418 along with the pushed CNAM 422 assigned to the 'A' number used by the calling entity 410. The device may answer or drop the call 424, however, the information shared with the called device may assist the user to elect to answer the call as opposed to dropping the call for not knowing the caller.

Figure 4B:
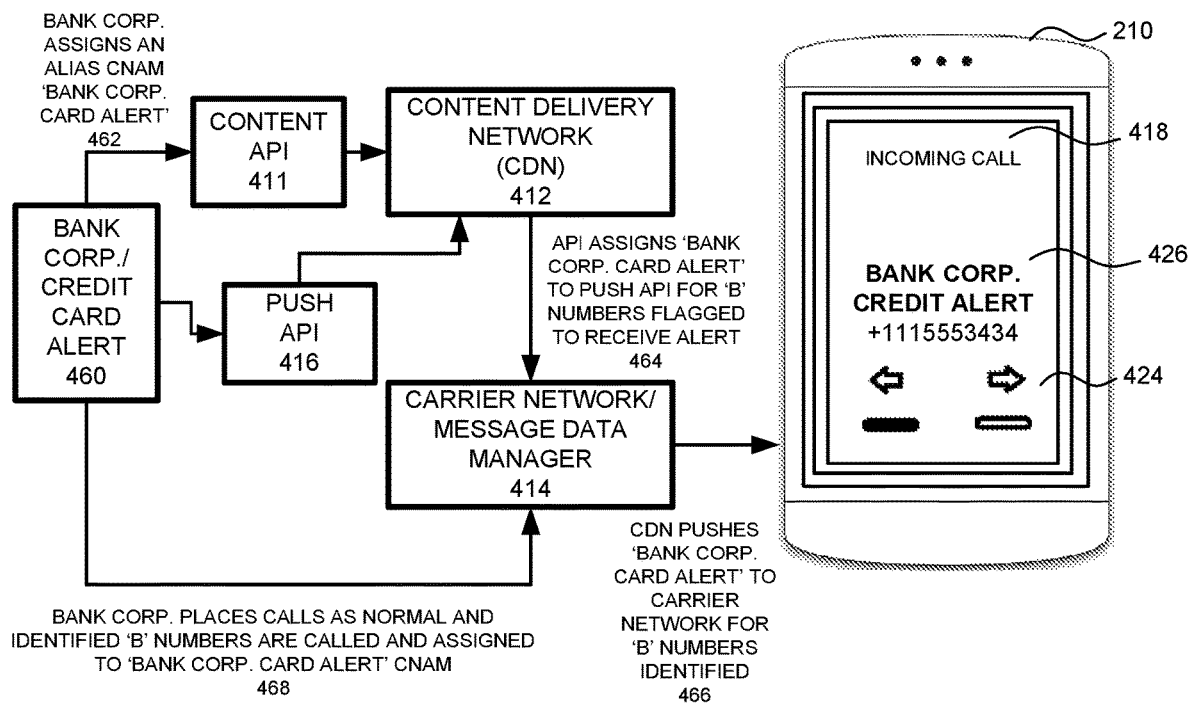
FIG. 4B illustrates a logic diagram of another process for customizing and forwarding alternative CNAM information to a mobile device.

FIG. 4B illustrates a logic diagram of another process for customizing and forwarding alternative CNAM information to a mobile device. Referring to FIG. 4B, the configuration 450 provides a scenario where the company 'Bank Corp.' is attempting to use another name for a certain promotion, campaign, purpose, etc. In this example, the bank is attempting to communicate to customers based on a credit card institution 460 managed by the bank group. In this example, the bank institution uses the alternative CNAM for its 'Card Alert' alias. The alias is not assigned to any 'B' numbers at the initial CNAM designation/creation process 462. However, during a fraud protection effort to identify the user accounts and corresponding 'B' numbers of devices which are linked to those accounts, the CNAM 'Card Alert' will be linked/assigned 464 to those accounts via the content API 411 and sent to the user devices through the push API 416. That way, a group of customers with fraud alert concerns can be temporarily assigned to the new CNAM until the matter is resolved. In this example, a time to live (TTL) may be used for the assignment process so existing 'B' numbers owned by the enterprise can be used to contact the customers for a period of time (i.e., the TTL duration) and the CNAM will identify the caller as the 'fraud alert' department of the bank for that TTL duration. The CDN 412 may push the CNAM 466 to the 'B' numbers identified on the carrier network 414. The enterprise bank can then place calls as normal and the correct CNAM will be assigned to the correct 'B' numbers 468 depending on those profiles which are flagged as potential fraud accounts or at least credit card holding accounts. The user account information may be stored in a database with certain flags/designations used to link those accounts to the current fraud alert call campaign, which effectively calls all such user devices via an automated call processing application. The CNAM in this example would be "Bank Corp. Credit Alert" 426.

Figure 5:
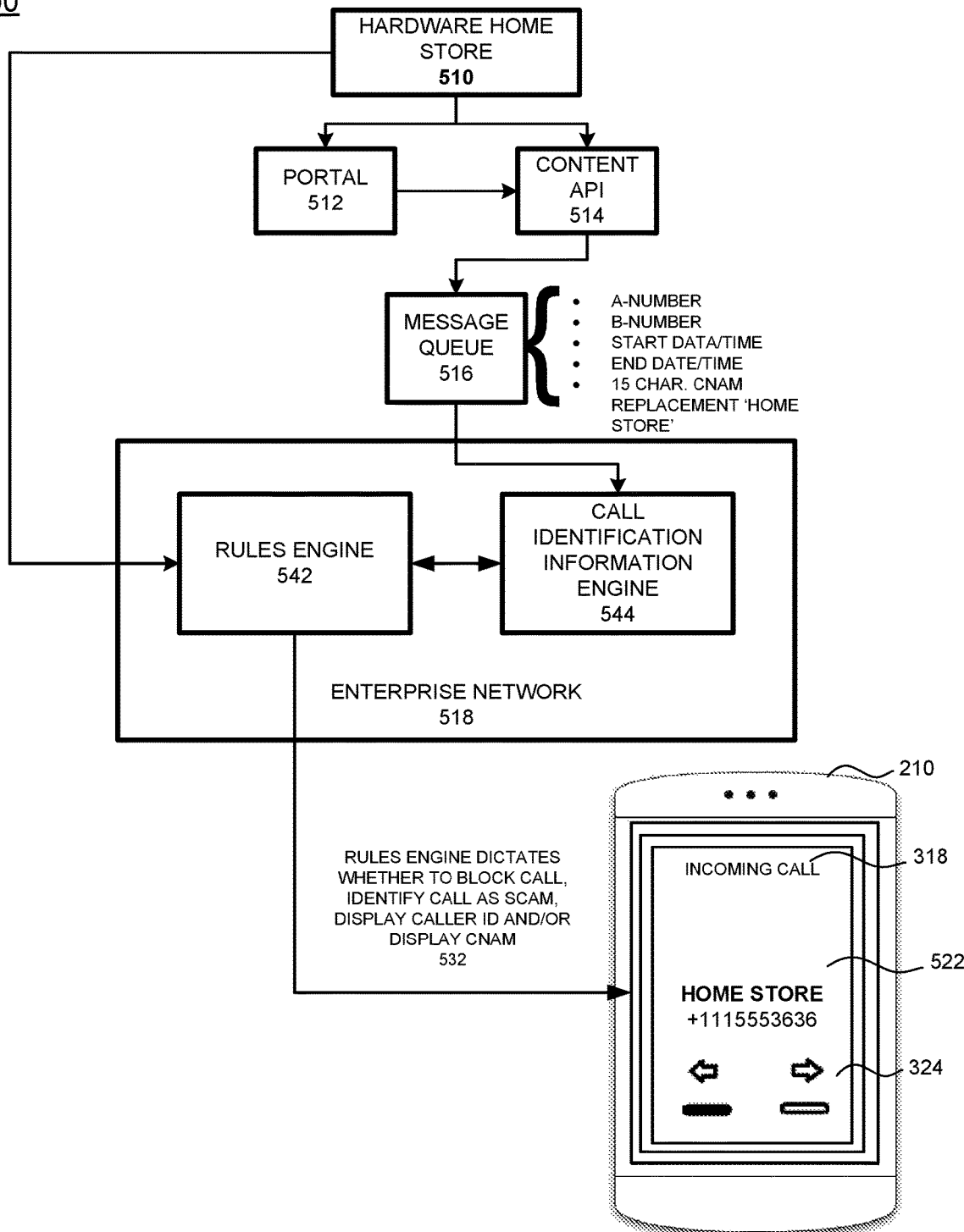
FIG. 5 illustrates a network configuration of another CNAM management process for customizing CNAM information for a mobile device.

FIG. 5 illustrates a network configuration of another CNAM management process for customizing CNAM information for a mobile device. Referring to FIG. 5, the configuration 500 includes an example with an enterprise entity, such as a retail hardware store 510 server having a content API 514 and a portal 512. The client, in this case, 'Hardware Store' may upload their assigned 'A' number(s), a 15-character Caller-ID CNAM, a start date/time, end date/time, etc. using the portal 512 and the API 514, where the portal 512 uses the API 514 to upload the data.

The data is encrypted and provided to a cloud service, such as a message queue service 516, which is a fully managed message queuing service that enables provide microservices, distributed systems, and serverless applications. The queue 516 then provides the information to the enterprise network 518 for data management purposes. The enterprise network 518 may include a customized rules engine 542 used to manage/screen calls or other communications to various end users, and a call identification information engine 544, which determines whether to apply a particular CNAM to an outgoing call from the enterprise. In one example, the rules engine 542 may dictate whether to block a call, label the call as scam, display a caller ID or other CNAM information, etc., 532. The example provides the end user device 210 receiving a CNAM of home store 522.

In operation, when a call is sent from the enterprise network of the hardware store entity 510, the call is routed through an edge server in the geographic region associated with the callee. Once the call is routed to the edge server, the determinations made include whether the 'A' number should be marked as a scam call, if yes, the call is marked as scam and the call is not routed to the callee. If the call is not identified as scam, then the call routing proceeds. Next, the 'A' number is examined to identify whether it has a CNAM application entry that is globally applied to all callees. In general, a global 'A' number is defined as an 'A' number that does not have an association to a 'B' number either through assignment pairing of the numbers and/or through a context association between numbers, such as a 'B' number that is linked to a particular 'A' number via a context assignment. A global 'A' number may be identified and then the CNAM assigned to that 'A' number may be assigned to the SIP header of the message to be sent to the 'B' number.

When an 'A' number does have an A-B entry in the database of the edge server or other server device, then there is an existing entry for that 'A' number that also identifies a specific 'B' number. In this example, then a new up-to 15-character replacement CNAM may be applied to the SIP header to override an existing or non-existing CNAM identifier. For example, a 'Hardware Store' CNAM could be overridden by a 'Hardware Delivery' CNAM assuming the 'B' number has an association with the 'A' number, such as a prior assignment by those user devices linked to an active hardware store delivery with a TTL of one day, two days, two weeks, etc., or via a context assignment of identifying the 'B' number from a list of delivery numbers and then replacing the global CNAM 'Hardware Store' with the temporary CNAM 'Hardware Delivery'. In general, the CNAM value is limited to 15 characters so the delivery CNAM would have to be truncated to accommodate the limited CNAM data, such as 'HardW. Delivery'.

Another example may include determining whether the callee is a caller ID subscriber, and if so, then a query to the CallerID database may be sued to apply the CallerID to the SIP header, and if not, then nothing will be entered into the SIP header of the SIP message and the call will connect with only the phone number displayed.

Figure 6A:
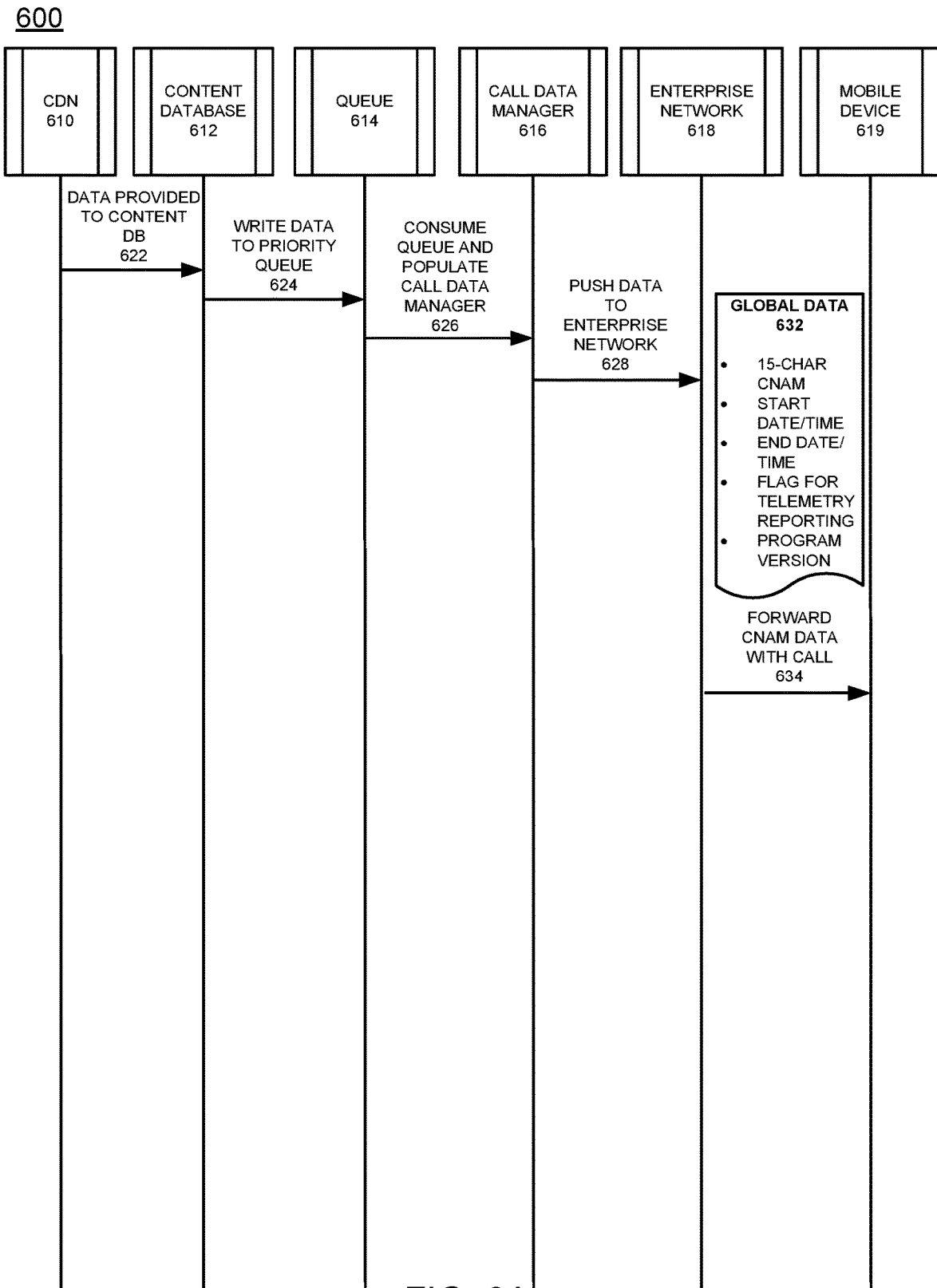
FIG. 6A illustrates an example system network flow diagram of a global setup for a CNAM according to example embodiments.

FIG. 6A illustrates an example system network flow diagram of a global setup for a CNAM according to example embodiments. Referring to FIG. 6A, the system configuration 600 includes a CDN 610 which provides data content 622 to the content database 612 for upcoming calls. The call data is written 624 to a priority queue 614 for processing. The message/call data manager 616 may consume the queue to process queued messages and to populate the message data manager 626 with call processing data. The updated call data may be pushed 628 to the enterprise network 618 and the global data 632 may be summarized as a 15-character CNAM, a start time and end time and date (TTL), a flag for telemetry data to be saved and sent back for logistic analyzation along with program version data. The enterprise 618 can then forward the CNAM and call data 634 to the end user mobile device 619 during a call session. In this example, the global setup of call data is occurring. This may include the uploading of a 15-Character CNAM (CallerID) and a business phone number to apply for the call. In this example, there are no specific target 'B' number devices being called. The CallerID CNAM applied is the default that will show whenever the business phone number(s) calls a user device on a network that uses the message data manager technology.

Figure 6B:
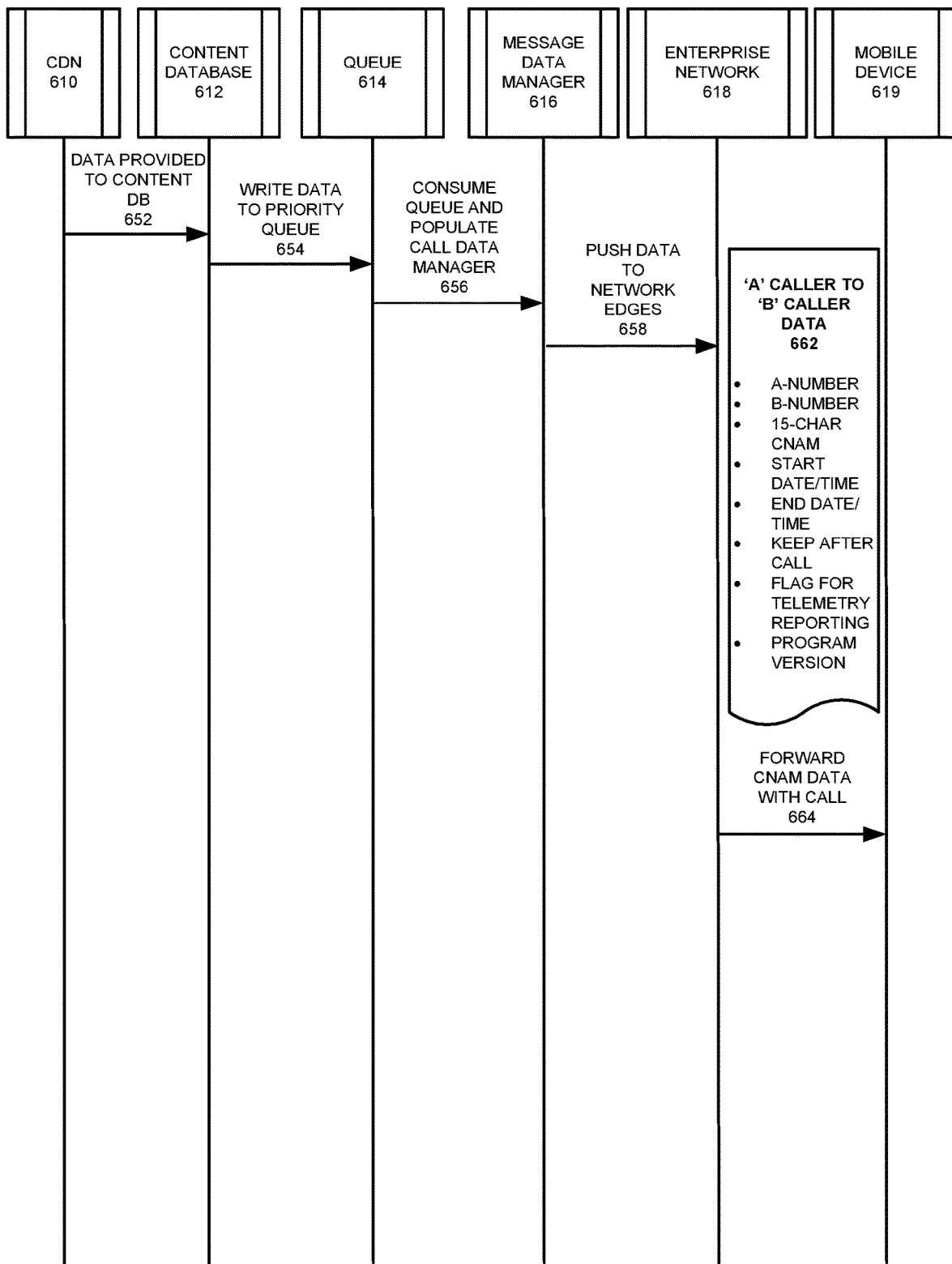
FIG. 6B illustrates an example system network flow diagram of a caller/callee setup for a CNAM according to example embodiments.

FIG. 6B illustrates an example system network flow diagram of a caller/callee setup for a CNAM according to example embodiments. Referring to FIG. 6B, the example configuration 650 includes a CDN 610 which provides data content 652 to the content database 612 for upcoming calls. The call data is written 654 to a priority queue 614 for processing. The message data manager 616 may consume the queue to process queued messages and to populate the message data manager 656 with call processing data. The updated call data may be pushed 658 to the enterprise network 618 and the global data 662 may be summarized as an 'A' number and 'B' number, a 15-character CNAM, a start time and end time and date (TTL), a flag for telemetry data to be saved and sent back for logistic analyzation along with program version data. The edge server 618 can then forward the CNAM and call data 664 to the end user mobile device 619 during a call session. In this example, the A-B number pairing and setup is occurring. This example may provide where a specified 15-Character CNAM will be applied to a specific set of 'B' numbers. This approach overwrites the default set up identified in configuration 600, but only for the specific 'B' numbers that the businesses are trying to call and which are identified on a per-number basis.

Figure 6C:
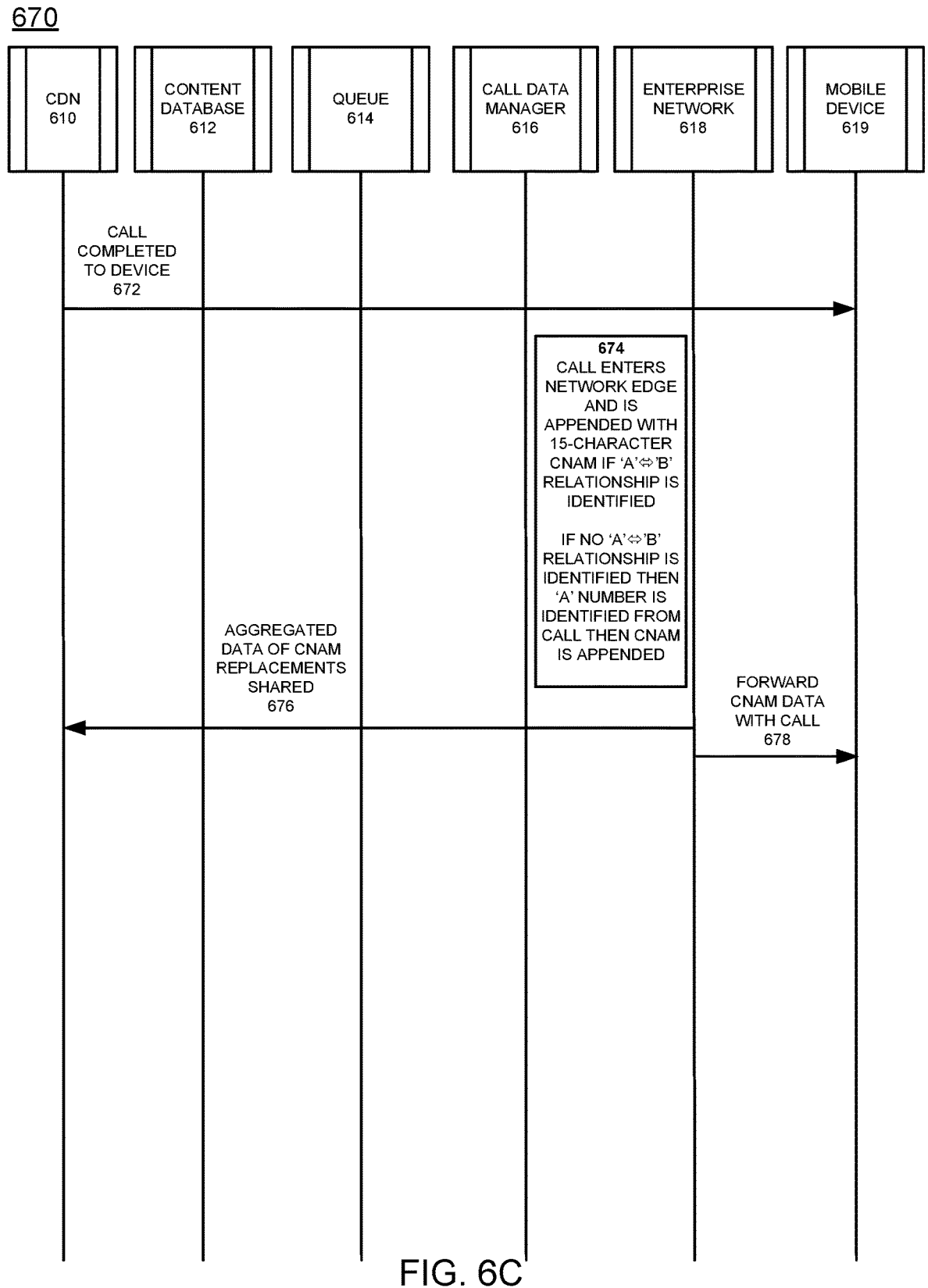
FIG. 6C illustrates an example system network flow diagram of a telemetry information process for a CNAM according to example embodiments.

FIG. 6C illustrates an example system network flow diagram of a telemetry information process for a CNAM according to example embodiments. Referring to FIG. 6C, the system 670 includes a CDN 610 responsible for managing content for a completed call 672 to an end user mobile device 619. In this example, when a call enters the enterprise 618 and is appended with a CNAM identifier 674, the relationship of the 'A' number and the 'B' number are identified to determine whether a link is identified from a database entry. The 'A' number may be tagged and certain data is then returned to a call data enhancement platform.

By default, if a call is identified as having an A-B relationship, the message data manager 616 may remove the entry from the default use scenario. If a call has no history of being made from the 'A' number to the 'B' number, the relationship entry is removed at the end of a TTL (date/time). If a call is placed, the call is then removed afterwards. When the 'keep after call' flag is set to true, the 'A' number can call the 'B' number as indefinitely as the relationship between A-B is preserved, and it won't be removed until the TTL has expired. When a call is placed, the CNAM data intended for the call may be forwarded accordingly 678. Aggregated data associated with the CNAM replacement may be shared as telemetry data 676 with the CDN 610, responsive to the call being placed. A flag may be used to associate with the product and/or demo version of the data association procedure. For example, the flag may be set to indicate whether the telemetry data returned is for a demo purpose or a live call product purpose, when the data is reported. If it is a demo call, then the telemetry data should not be included in a billing or reporting data analysis.

Figure 7A:
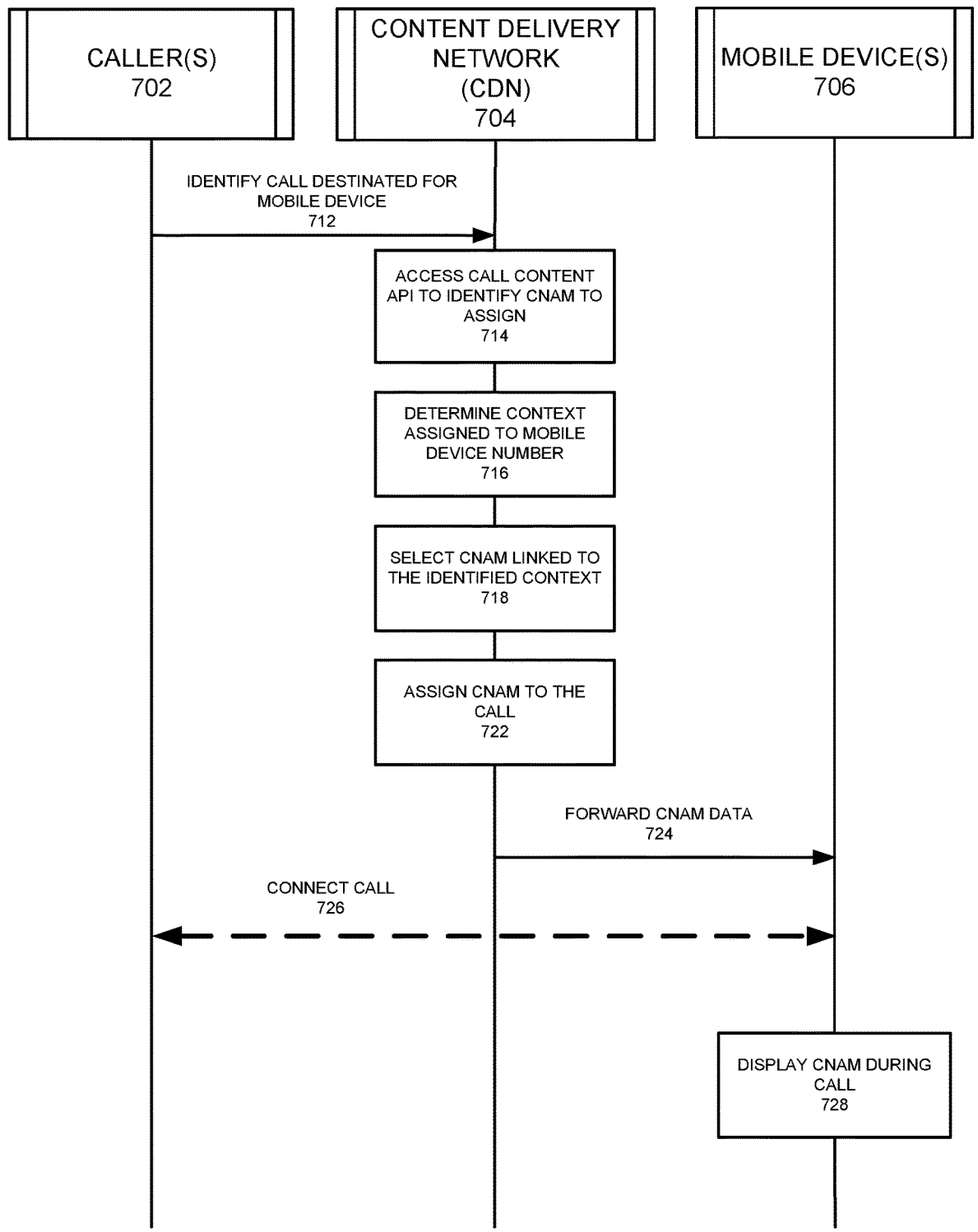
FIG. 7A illustrates a system messaging diagram of a call data management configuration according to example embodiments.

FIG. 7A illustrates a system messaging diagram of a call data management configuration according to example embodiments. Referring to FIG. 7A, the system 700 may include caller(s) 702, such as an enterprise entity or 'A' number entity, dialing and communicating with a called party 'B' number party, such as mobile device 706. The CDN 704 identifies and manages content delivery to the called device. In operation, a process may provide identifying a call from a calling device destined for a mobile device 712, responsive to identifying a calling device number assigned to the calling device, accessing a call content application programming interface (API) 714, operated by a content delivery device of the network 704, and configured to deliver to the mobile device a first caller identification name (CNAM) or a second CNAM, assigned to the calling device number. The process may also include determining a context assigned to a mobile device number 716, in order to select the appropriate CNAM 718 that is linked to the context identified. The selected CNAM may then be assigned 722 to the selected call.

The process may also include forwarding the selected CNAM 714 to the mobile device, connecting the call 726 between the calling device and the mobile device and displaying the selected CNAM on the mobile device 728. The process may also include identifying a time-to-live (TTL) parameter associated with the selected CNAM, and when the time and date are active, applying the selected CNAM to the call. When the TTL has expired or is inactive the identified CNAM may be disregarded and not applied to the call. The TTL may include a start date, a start time and/or a period of time until the TTL expires. The context may include one or more parameters linked to the selected CNAM and associated with the mobile device. The CNAM may include a one to fifteen character alphanumeric message or the CNAM may be an electronic CNAM (ECNAM) that includes at least one of a one to fifteen character alphanumeric message, a uniform resource locator (URL) link, image data, video data and/or audio data.

Figure 7B:
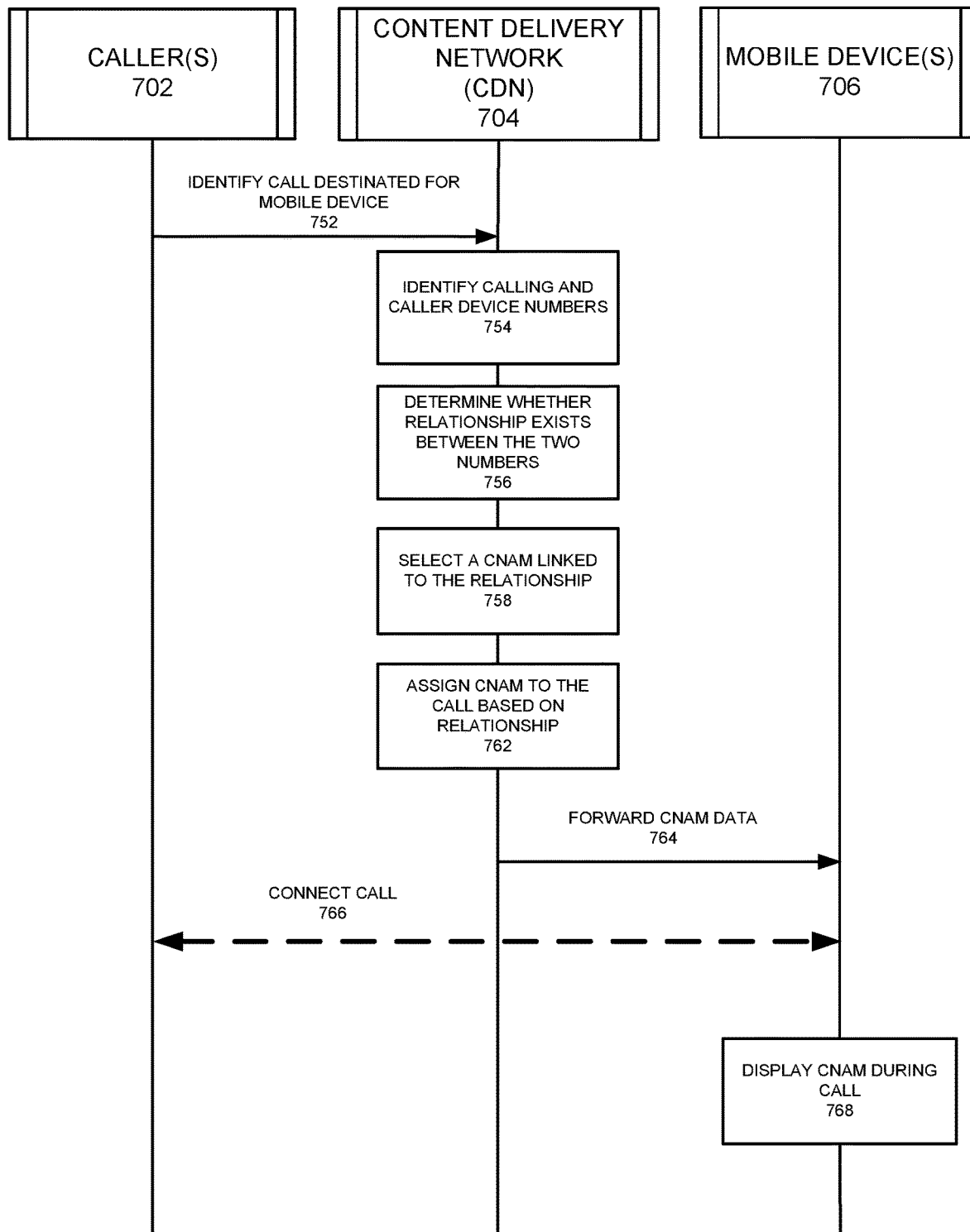
FIG. 7B illustrates another system messaging diagram of a call data management configuration according to example embodiments.

FIG. 7B illustrates another system messaging diagram of a call data management configuration according to example embodiments. Referring to FIG. 7B, the system configuration 750 includes an example process which provides identifying a call 752 from a calling device destined for a mobile device, identifying a calling device number associated with the calling device and a mobile device number 754 associated with the mobile device, determining whether a stored calling relationship exists between the calling device number and the mobile device number 756, such as a historical A-B number relationship stored in memory. If so, the relationship is used to select and apply a CNAM to the relationship 758, then, the process may provide appending/assigning one of a plurality of caller identification names (CNAM) 762 to the call based on the determination as to whether there is a stored calling relationship. The CNAM data is then forwarded 764 to the called device 706, the call is connected 766 and the CNAM data can be displayed 768 during the call. When the stored calling relationship does exist, the call content application programming interface (API) operated by the content delivery device is accessed and a previously assigned CNAM is retrieved and applied to the mobile device number. The method may include transmitting the previously assigned CNAM to the mobile device, and displaying the previously assigned CNAM on the mobile device when the call is connecting the calling device and the mobile device. In the event when the stored calling relationship does not exist between A and B numbers, the CDN may retrieve a default CNAM assigned to the calling device number instead of any alternative CNAMS, transmitting the default CNAM to the mobile device, and displaying the previously assigned CNAM on the mobile device when the call is connecting the calling device and the mobile device.

Figure 8:
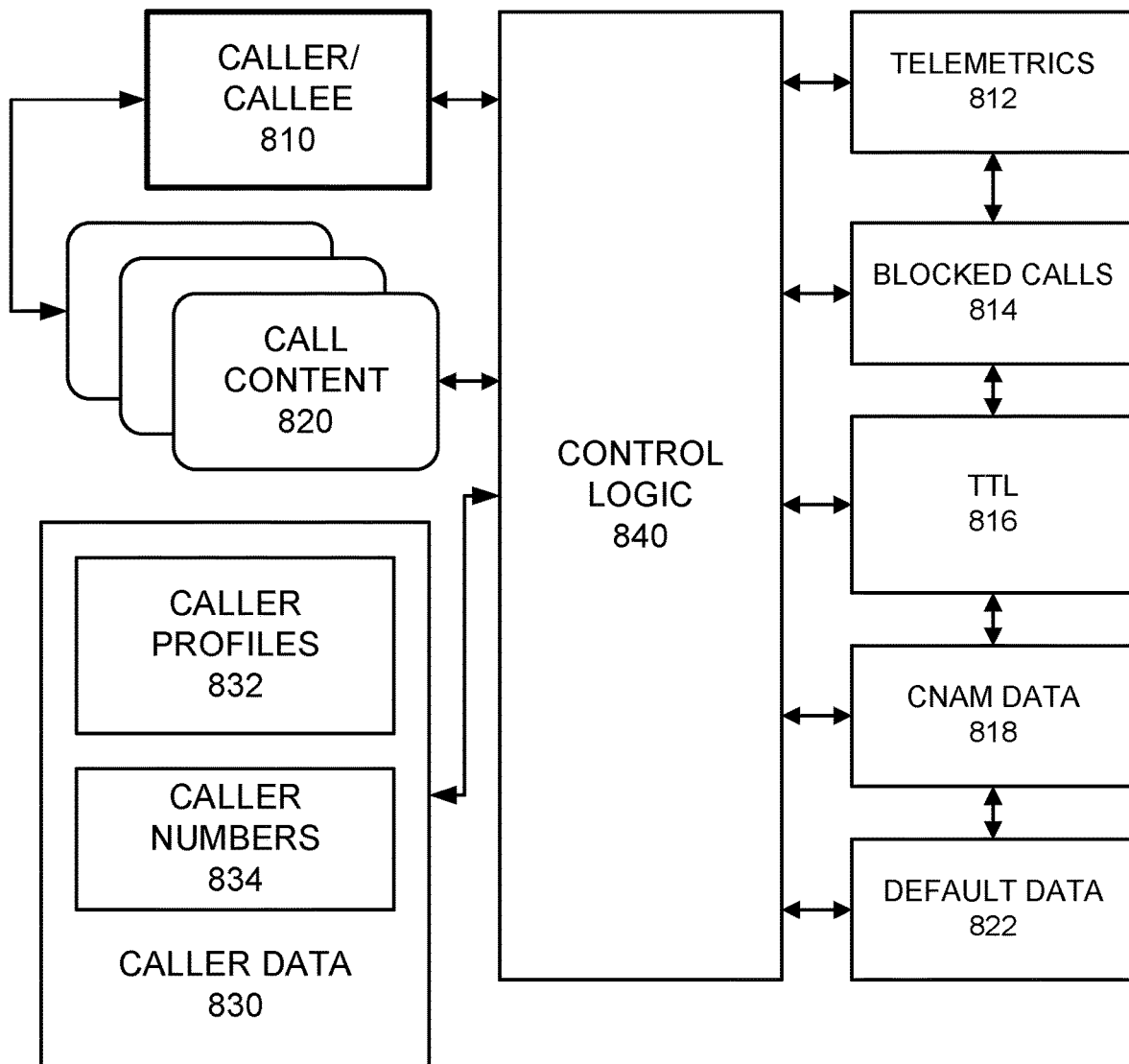
FIG. 8 illustrates a logic diagram with example data input and output parameters for performing CNAM data management according to example embodiments.

FIG. 8 illustrates a logic diagram with example data input and output parameters for performing CNAM data management according to example embodiments. Referring to FIG. 8, the logic diagram 800 includes various input parameters and output parameters which may be processed by the processor logic 840. For example, the caller and callee entities 810 may be identified by name and/or number, the call content 820 identified may include CNAM data to forward to the callee prior to connecting the call, and caller data 830 may include caller profiles 832, caller numbers 834 and any existing relationship data between the entities. The output may include telemetrics 812 from calls completed, blocked calls from filtered calls 814, a TTL 816 depending on the TTLs assigned to the CNAMs, certain CNAM data 818 selected for the call, and/or default data 822 applied to the call depending on the CNAM data assigned or not assigned.

Figure 9:
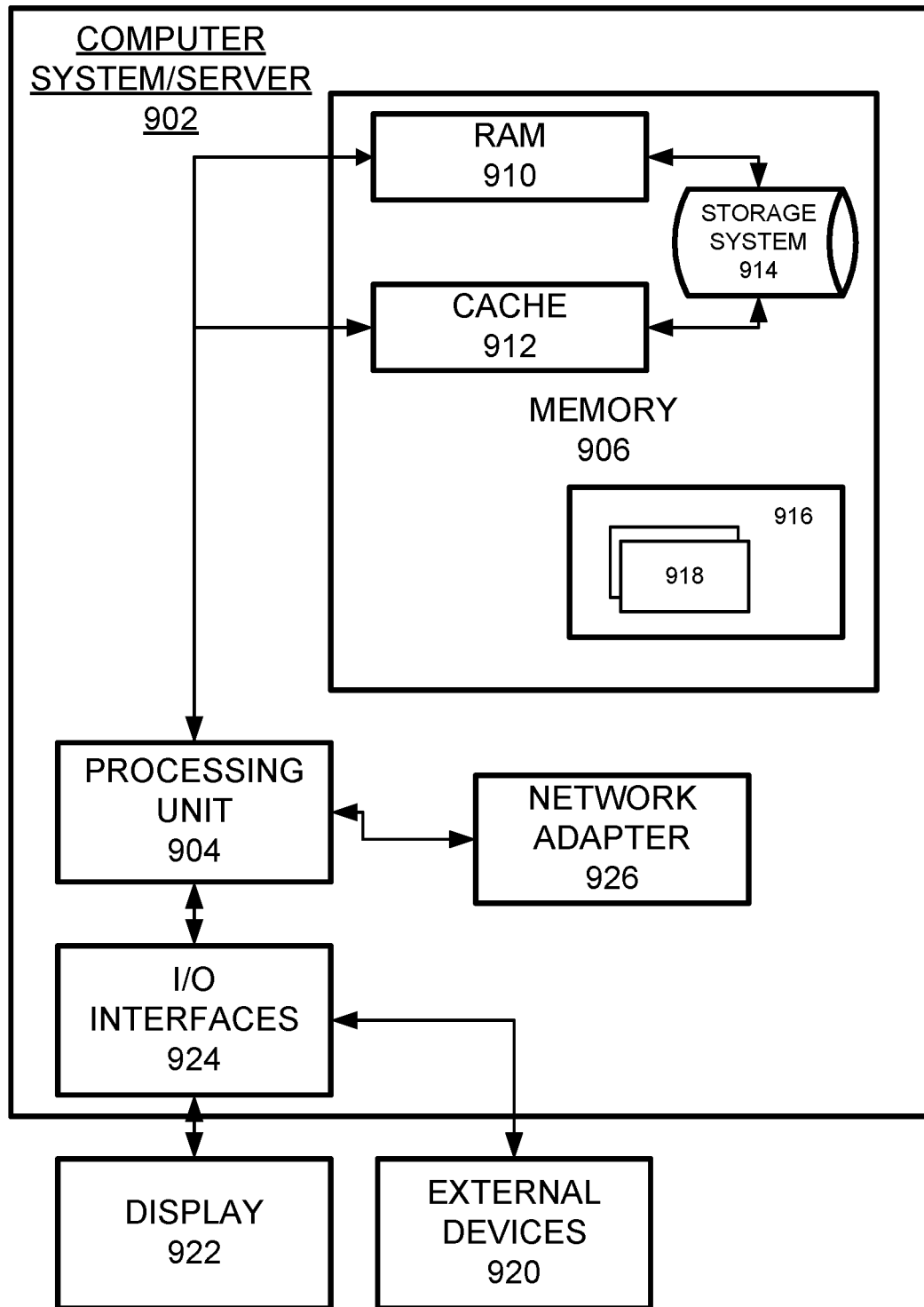
FIG. 9 illustrates an example network entity device configured to store instructions, software, and corresponding hardware for executing the same, according to example embodiments of the present application.

FIG. 9 illustrates an example network entity device configured to store instructions, software, and corresponding hardware for executing the same, according to example embodiments of the present application.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

FIG. 9 is not intended to suggest any limitation as to the scope of use or functionality of embodiments of the application described herein. Regardless, the computing node 900 is capable of being implemented and/or performing any of the functionality set forth hereinabove.

In computing node 900 there is a computer system/server 902, which is operational with numerous other general purpose or special purpose computing system environments or configurations. Examples of well-known computing systems, environments, and/or configurations that may be suitable for use with computer system/server 902 include, but are not limited to, personal computer systems, server computer systems, thin clients, rich clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 902 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 902 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 902 in cloud computing node 900 is shown in the form of a general-purpose computing device. The components of computer system/server 902 may include, but are not limited to, one or more processors or processing units 904, a system memory 906, and a bus that couples various system components including system memory 906 to processor 904.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 902 typically includes a variety of computer system readable media. Such media may be any available media that is accessible by computer system/server 902, and it includes both volatile and non-volatile media, removable and non-removable media. System memory 906, in one embodiment, implements the flow diagrams of the other figures. The system memory 906 can include computer system readable media in the form of volatile memory, such as random-access memory (RAM) 910 and/or cache memory 912. Computer system/server 902 may further include other removable/non-removable, volatile/non-volatile computer system storage media. By way of example only, storage system 914 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 906 may include at least one program product having a set (e.g., at least one) of program modules that are configured to carry out the functions of various embodiments of the application.

Program/utility 916, having a set (at least one) of program modules 918, may be stored in memory 906 by way of example, and not limitation, as well as an operating system, one or more application programs, other program modules, and program data. Each of the operating system, one or more application programs, other program modules, and program data or some combination thereof, may include an implementation of a networking environment. Program modules 918 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 902 may also communicate with one or more external devices 920 such as a keyboard, a pointing device, a display 922, etc.; one or more devices that enable a user to interact with computer system/server 902; and/or any devices (e.g., network card, modem, etc.) that enable computer system/server 902 to communicate with one or more other computing devices. Such communication can occur via I/O interfaces 924. Still yet, computer system/server 902 can communicate with one or more networks such as a local area network (LAN), a general wide area network (WAN), and/or a public network (e.g., the Internet) via network adapter 926. As depicted, network adapter 926 communicates with the other components of computer system/server 902 via a bus. It should be understood that although not shown, other hardware and/or software components could be used in conjunction with computer system/server 902. Examples include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:
   identifying, via a content delivery device, a call from a calling device destined for a called device;
   identifying, via the content delivery device, a calling device number assigned to the calling device;
   receiving, via the content delivery device, a first caller identification name (CNAM) or a second CNAM from a call content application programming interface (API), where one of the first CNAM or the second CNAM is to be assigned to the calling device number and provided to a called device;
   determining whether to assign the first CNAM or the second CNAM to the calling device number based on contextual information associated with a previously logged transaction identifying transaction information linked to the called device number and the calling device number;
   assigning the first CNAM or the second CNAM to a push API based on the identified contextual identification;
   receiving, via the content delivery device, the assignment of one of the first CNAM or the second CNAM; and
   communicating, via the content delivery device, the assigned CNAM to a carrier network for communication to the called device.

2. The method of claim 1, comprising:
   displaying the assigned CNAM on the called device.

3. The method of claim 1, comprising:
   identifying a time-to-live (TTL) parameter associated with the assigned CNAM; and
   when the time and date are active, applying the assigned CNAM to the call.

4. The method of claim 3, wherein the TTL comprises at least one of:
   a start date and a start time, and a period of time until the TTL expires.

5. The method of claim 1, wherein the context comprises:
   one or more parameters linked to the assigned CNAM and associated with the called device.

6. The method of claim 1, wherein each of the first CNAM and the second CNAM comprise:
   a one to fifteen character alphanumeric message.

7. The method of claim 1, wherein each of the first CNAM and the second CNAM is an electronic CNAM (ECNAM) that comprises at least one of:
   a one to fifteen character alphanumeric message, a uniform resource locator (URL) link, image data, video data, and audio data.

8. A system comprising:
   a computing device configured to:
      identify a call from a calling device destined for a called device;
      identify a calling device number assigned to the calling device;
      receive a first caller identification name (CNAM) or a second CNAM from a call content application programming interface (API), where one of the first CNAM or the second CNAM is to be assigned to the calling device number and provided to the called device;

determine whether to assign the first CNAM or the second CNAM to the calling device number based on contextual information associated with a previously logged transaction identifying transaction information linked to the called device number and the calling device number;

assign the first CNAM or the second CNAM to a push API based on the identified contextual identification;

receive the assignment of one of the first CNAM or the second CNAM; and communicate the assigned one of the first CNAM or the second CNAM to a carrier network for communication to the called device.

9. The system of claim 8, wherein the computing device is further configured to:

display the assigned CNAM on the called device.

10. The system of claim 8, wherein the computing device is further configured to:

identify a time-to-live (TTL) parameter associated with the assigned CNAM; and when the time and date are active, apply the selected CNAM to the call.

11. The system of claim 10, wherein the TTL comprises at least one of:

a start date and a start time, and a period of time until the TTL expires.

12. The system of claim 8, wherein the context comprises:

one or more parameters linked to the assigned CNAM and associated with the called device.

13. The system of claim 8, wherein each of the first CNAM and the second CNAM comprise:

a one to fifteen character alphanumeric message.

14. The system of claim 8 wherein each of the first CNAM and the second CNAM is an electronic CNAM (ECNAM) that comprises at least one of:

a one to fifteen character alphanumeric message, a uniform resource locator (URL) link, image data, video data and audio data.

15. A non-transitory computer readable storage medium configured to store one or more instructions that when executed by a processor cause the processor to perform:

identifying, via a content delivery device, a call from a calling device destined for a called device;

identifying, via the content delivery device, a calling device number assigned to the calling device;

receiving, via the content delivery device, a first caller identification name (CNAM) or a second CNAM from a call content application programming interface (API), where one of the first CNAM or the second CNAM is to be assigned to the calling device number and provided to a called device;

determining whether to assign the first CNAM or the second CNAM to the calling device number based on contextual information associated with a previously logged transaction identifying transaction information linked to the called device number and the calling device number;

assigning the first CNAM or the second CNAM to a push API based on the identified contextual identification;

receiving, via the content delivery device, the assignment of one of the first CNAM or the second CNAM; and communicating, via the content delivery device, the assigned CNAM to a carrier network for communication to the called device.

16. The non-transitory computer readable storage medium of claim 15, wherein the one or more instructions further cause the processor to perform:

displaying the assigned CNAM on the called device.

17. The non-transitory computer readable storage medium of claim 15, wherein the one or more instructions further cause the processor to perform:

identifying a time-to-live (TTL) parameter associated with the selected CNAM; and when the time and date are active, applying the selected CNAM to the call.

18. The non-transitory computer readable storage medium of claim 17, wherein the TTL comprises at least one of:

a start date and a start time, and a period of time until the TTL expires.

19. The non-transitory computer readable storage medium of claim 15, wherein the context comprises:

one or more parameters linked to the assigned CNAM and associated with the called device.

20. The non-transitory computer readable storage medium of claim 15, wherein each of the first CNAM and the second CNAM comprise:

a one to fifteen character alphanumeric message.

* * * * *